Aug. 21, 1951  G. B. LITCHFORD ET AL  2,564,703
OMNI-AZIMUTH GUIDANCE SYSTEM
Filed Oct. 29, 1947  3 Sheets-Sheet 1
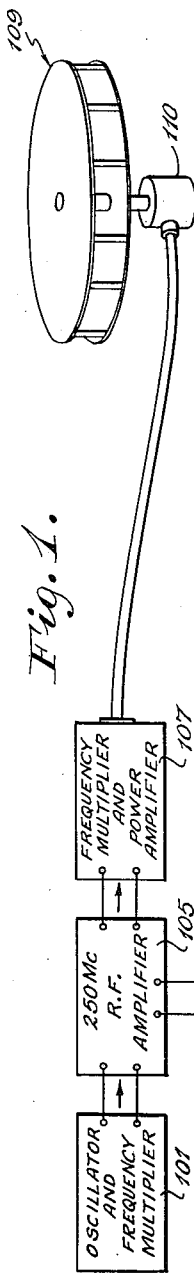
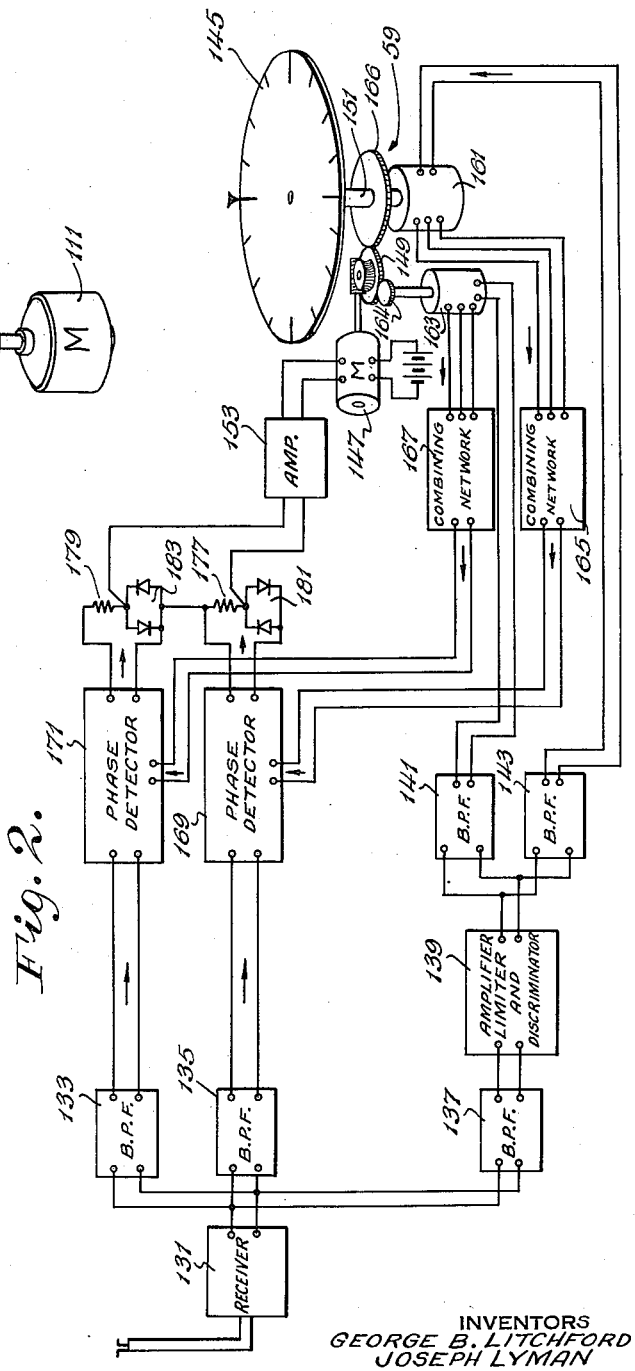
INVENTORS
GEORGE B. LITCHFORD
JOSEPH LYMAN
BY
ATTORNEY

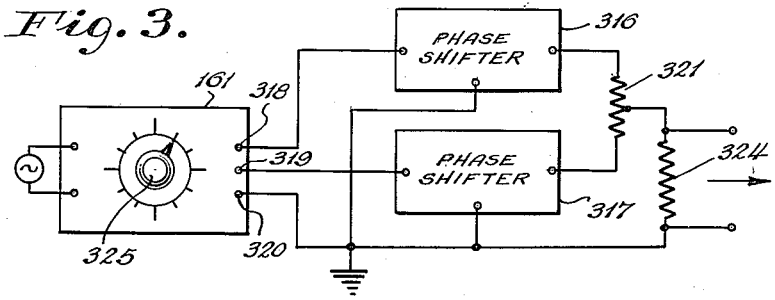
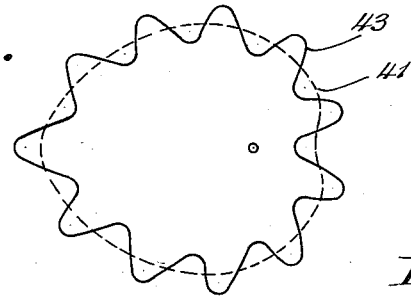
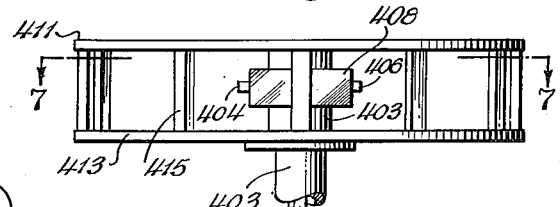
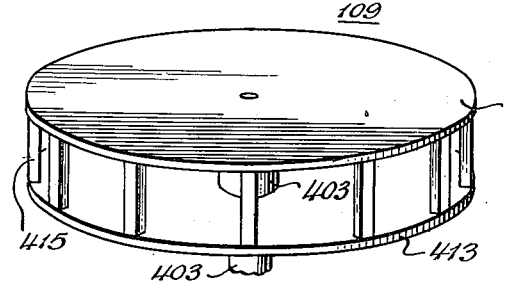
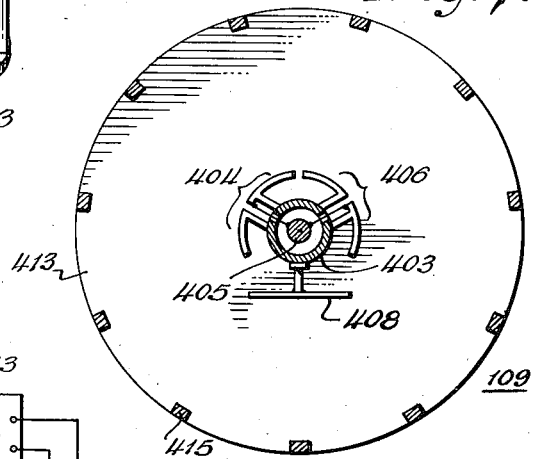
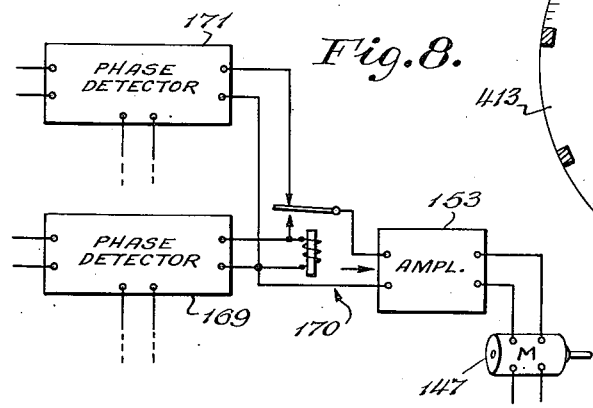

Aug. 21, 1951     G. B. LITCHFORD ET AL     2,564,703

OMNI-AZIMUTH GUIDANCE SYSTEM

Filed Oct. 29, 1947     3 Sheets-Sheet 3

INVENTORS
GEORGE B. LITCHFORD
JOSEPH LYMAN
BY
ATTORNEY

Patented Aug. 21, 1951

2,564,703

UNITED STATES PATENT OFFICE 2,564,703

OMNI-AZIMUTH GUIDANCE SYSTEM

George B. Litchford and Joseph Lyman, Huntington, N. Y., assignors to The Sperry Corporation, a corporation of Delaware Application October 29, 1947, Serial No. 782,722

13 Claims. (Cl. 343—106)

The present invention is concerned with navigational and traffic control aids for movable craft, and is particularly concerned with apparatus for enabling the operators of the craft to make accurate determinations of their bearings relative to a fixed station of known position.

In the prior art, omni-azimuth direction reference systems have been constructed employing a rotating antenna pattern and a timing or reference wave transmitting arrangement; the associated craft-borne receiving equipment consisting of a radio receiver and a phase-comparison direction indicator, e. g. a phasemeter.

In such arrangements, azimuthal direction in terms of the azimuth bearing from the fixed station may be determined within an angle of a few degrees if care is exercised in the design and construction of the transmitting equipment and craft-borne receiving equipment. However, such systems are not sufficiently accurate where very close tolerance requirements must be met, as for example in air traffic control for modern high-speed aircraft in congested air traffic zones. Furthermore, obstacles such as buildings or sharp irregularities in the terrain within a radius of a few miles from the fixed transmitting station have been found to cause appreciable angular errors in the direction determinations afforded with these prior art systems. These troubles have been particularly noticeable where a large low-frequency fixed antenna array such as an Adcock array was supplied with successively-varied energy components for effecting vertical-axis rotation of a radiation pattern lobe.

An object of the present invention is to provide improved omni-azimuth direction reference apparatus.

A more specific object is to provide an omni-azimuth direction reference system characterized by more precise angular indication than heretofore obtainable with omni-azimuth systems of single-lobe radiation patterns, and of accuracy capabilities in high contrast to those of prior, low frequency systems.

Yet a further object is to provide an omni-azimuth direction determining system wherein tendencies toward introduction of azimuth indication errors due to the presence of electromagnetic wave reflecting buildings or hills or other irregularities of the terrain in the neighborhood of the fixed reference station are substantially eliminated.

The present invention overcomes the above shortcomings of prior omni-azimuth systems by the arrangement of the transmitting antenna to provide a rotating pattern characterized not only by a single-lobe or limacon-like general form but also by a scalloped or multi-fingered outline superimposed thereon, and by transmission and reception of two reference phase signals of integral frequency ratio. One of the reference signals has a period equal to the period of rotation of the directive pattern and the other has a period shorter than the period of the first, in the ratio of the number of fingers superimposed upon the general shape of the lobe. In the craft-borne receiving equipment, the phases are compared both as to the long-period waves and as to the short-period waves introduced by the several fingers, and high azimuthal accuracy is achieved as well as greatly reduced error due to obstacles or irregular terrain. This accuracy and independence of terrain errors is enhanced by reliance upon physical rotation of such parts of the antenna system as are instrumental in determining the azimuthal energy distribution pattern, and by controlling the vertical-plane energy distribution pattern in such a way as to concentrate most of the transmitted energy in angles of elevation above the horizontal.

Referring now to the drawings,

Figs. 1 and 2 are diagrams of an omni-azimuth transmitting station and a craft-borne receiving equipment according to the present invention;

Fig. 3 is a circuit diagram illustrating the phase shifter system employed in the receiving equipment of Fig. 2;

Fig. 4 is a polar plot of the azimuthal intensity distribution pattern radiated by the transmitting antenna in Fig. 1;

Figs. 5, 6 and 7 are oblique, elevation and sectional views, respectively, of an antenna unit suitable for generating the azimuthal pattern of Fig. 4;

Fig. 8 is a diagram of a relay interconnection modification applicable to Fig. 2;

Figure 9:
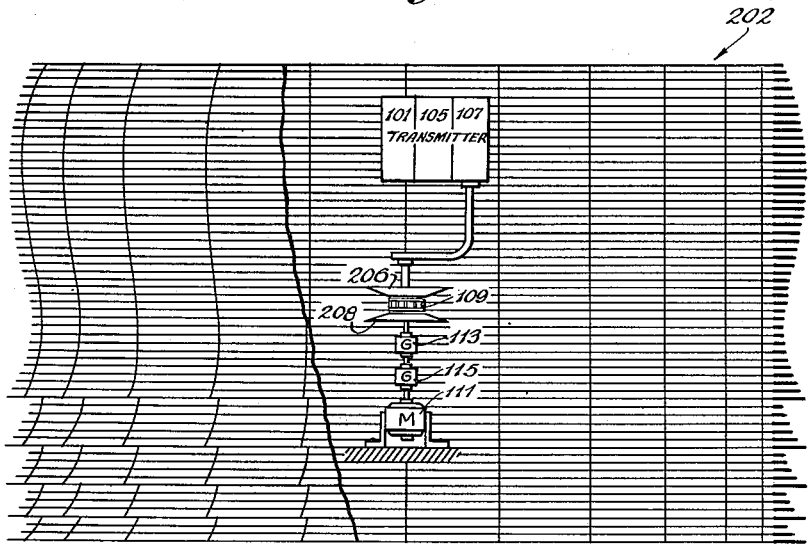
Fig. 9 is an elevation of the entire fixed-station antenna system, parts being broken away to show the construction thereof.

In the fixed transmitting station of Fig. 1, an oscillator and frequency multiplier unit 101 is provided for supplying radio-frequency excitation power to a radio frequency amplifier 105 having its output circuit arranged to drive a frequency multiplier and radio frequency power amplifier 107. The power amplifier 107 supplies output power to a rotatably supported antenna system 109 arranged to be rotated at high speed by a driving motor 111, e. g. at 1650 R. P. M.

The transmitting antenna 109 is illustrated in Fig. 5 as constructed in a shape generally resembling a vertical-axis drum, and the details of this antenna may be as shown in Figs. 5–7, for producing an azimuthal radiant energy distribution pattern generally according to Fig. 4.

The rotatable transmitting antenna 109 is of such design as to provide an azimuthal radiation pattern substantially as shown in Fig. 4. This pattern is characterized by a scallop plan of $n$ fingers, where $n$ is preferably an odd number, e. g. 11. Such a pattern may be produced by the use of a double arcuate dipole and reflector central antenna with a special $n$-finger pattern fringe modifier, as shown in Figs. 5, 6 and 7. Two arcuate doublet or dipole parts 404 and 406 are provided (see especially Fig. 7), each having one arcuate arm connected to the outer sheath 403 of a coaxial feed line and the other arm connected to the inner conductor 405 of the coaxial line. These arcuate dipoles each occupy a 120° sector about the vertical axis of the system, at a radius of approximately ¼ wavelength. A conductive reflector plate 408 is supported on an arm extending back from the outer sheath 403, this plate being spaced approximately ¼ wavelength from the axis of the system and being positioned directly opposite the two arcuate dipoles. The dimensions of the reflector plate, in terms of wavelength, may be approximately ¼ wavelength high by ½ wavelength wide. The central unit comprising antenna elements 404, 406, and 408 produces a limacon pattern, the shape of which is indicated in dotted line 41 in Fig. 4.

These elements are positioned at the middle of a drum formed with upper and lower conductive plates 411 and 413, which serve together as a wave guide for guiding the energy from the central unit to the peripheral aperture. Vertical staves or columns such as column 415 are provided for distorting the fringe of the limacon-shaped pattern in such a manner as to provide the $n$ scallops or fingers therearound for achieving "fine-and-coarse" modulation frequency control features, the resultant azimuthal directivity pattern of unit 109 being as shown at 43 in Fig. 4. These $n$ vertical bars may be made of dielectric material or of a semi-conductor, as desired, since the fringing can be accomplished by any such elements as will cause regular alternations around a circular locus of the phase velocity of energy emerging between the peripheries of plates 411 and 413.

Returning now to Fig. 1, two alternating voltage generators 113 and 115 are coupled to antenna 109 so that their rotors revolve in fixed relation therewith. These generators may comprise permanently magnetized rotors and cooperating stator output coils. Generator 115 is provided with a two-pole permanently magnetized rotor, while generator 113 is provided with a rotor characterized by $n$ pairs of poles, or a stator made up of $n$ dual-pole sections. Generator 115 produces output voltage at the frequency of rotation of antenna 109, while generator 113 produces output voltage of $n$ times the frequency of rotation. For this purpose, generator 113 may if desired be a simple generator geared to the rotor of generator 115 through $n$ ratio gears. The voltage from generator 115 provides a reference for comparison with the rotation frequency modulation component due to the general limacon-like shape of the antenna pattern, and the output voltage of generator 113 provides a phase reference signal for phase comparison with the high frequency amplitude modulation component observed in any azimuth direction due to the $n$ scallops around the fringe of the directional pattern.

These reference phase voltages from generators 113 and 115 are added and amplified in unit 117, and impressed by frequency modulation upon a subcarrier signal generated in an oscillator unit 119. This frequency modulated subcarrier signal is in turn supplied to the input terminals of an amplitude modulator 121 coupled to unit 105 for introducing subcarrier modulation into the output energy radiated through antenna 109. The subcarrier modulation arrangement described above is merely illustrative of the arrangements which may be used for transmitting phase reference signals to the craft. Another way to accomplish the phase reference signal transmission is by frequency modulation of unit 101 according to the phase reference signal wave, as set forth in U. S. Patent 2,377,902 to M. Relson.

A receiving system and azimuth direction indicator for responding to the transmitter of Fig. 1 is set forth in Fig. 2. A craft radio receiver 131 having a wide-band detector output circuit is coupled to the input circuits of three band-pass filters 133, 135 and 137. The last of these filter units, filter 137 is designed to respond to the subcarrier output frequency of subcarrier generator 119 (Fig. 1), for selecting the demodulation component of the received signal which is due to the subcarrier modulation in the fixed station system. This selected demodulation signal is supplied to an amplifier, limiter and discriminator arrangement 139 of conventional design for frequency modulation reception, and this unit supplies at its output terminals the demodulation components corresponding to the voltages impressed by generators 113 and 115 (Fig. 1) on unit 117.

The demodulation output voltage from unit 139 is supplied to the input circuits of band-pass filters 141 and 143. Band-pass filters 133 and 141 are designed to pass voltage components of the frequency of the output of generator 113; and filters 135 and 143 are tuned to pass the antenna rotation frequency, i. e., the frequency produced by generator 115.

A servo system is provided for angularly positioning a directional chart table 145 in indicator 59 generally according to the phase relation between the outputs of band-pass filters 135 and 143 and precisely according to the phase relations between the output voltages of band-pass filters 133 and 141. This servo system inclues a servomotor 147 coupled through a gear train 149 to the vertical shaft 151 of the rotary azimuthal direction table 145, and an amplifier 153 for supplying reversible-polarity excitation power to the control voltage input terminals of the motor 147.

A first variable transformer 161 is provided with its rotor connected directly to the shaft 151 and a second variable transformer 163 is coupled through gears 164 and 166 to the shaft 151, the gear ratio being equal to the factor $n$. These variable transformers 161 and 163 are units of the telemetric type, for example Selsyns. The rotor windings of these units are connected to the output circuits of band-pass filters 143 and 141, respectively, and their respective multi-component output circuits are connected to fixed phase shift combining networks 165 and 167.

Fig. 3 shows a Selsyn unit 161 connected to fixed phase shift circuits 316 and 317 and coupled through these circuits to the summation circuit including resistor elements 321 and 324. Circuits 316, 317 and elements 321 and 324 together comprise a unit as indicated at 165 in Fig. 2. This diagram illustrates the circuit interconnections likewise typical of phase shifter system 163, 167. Phase shifters 316 and 317 are phase shifting networks designed to produce opposite phase shifts totaling 120° phase difference, so that the voltages at terminals 318 and 319 (with reference to common terminal 320) are added as 120°-separated components of relative magnitudes dependent upon the angular position of the knob 325. These components are combined to produce a voltage across resistor 324 representing a phase shifted version of the input alternating voltage shifted through an angle as represented by the pointer position of the knob 325. Such a phase shifting interconnection as illustrated in Fig. 3 is described and claimed in application Serial No. 729,852, J. E. Browder et al., filed February 20, 1947, now Patent No. 2,528,525, and assigned to the assignee of the present invention.

The output circuits of networks 165 and 167 are each connected to a first input circuit of respective phase sensitive detectors 169 and 171. The second input circuit of detector 171 is supplied with the output of band-pass filter 133, and the second input circuit of phase detector 169 is supplied with the output of band-pass filter 135. The output circuits of the phase detectors are coupled to the motor supply amplifier 153, for controlling the speed and direction of rotation of turntable 145 by the servomotor 147. The connections of the phase detectors with the motor amplifier 153 and the arrangement of the phase shifters 161, 163 and combining networks 165, 167 are such that the motor 147 is made to operate in direction and extent as required to maintain the turntable 145 positioned in azimuthal direction generally according to the phase relation between the outputs of filters 135 and 143 and more precisely according to the phase relation between the outputs of filters 141 and 133.

When the angular position of the turntable 145 is in accord with the bearing of the craft from the fixed station, the signals supplied to phase detector 169 directly from band-pass filter 135 and through the phase shifter system 161, 165 from band-pass filter 143 are approximately in the phase relation for zero output from unit 169, and hence the output of this unit is inappreciable. Furthermore, under these conditions, the phase relation between the signal supplied directly from band-pass filter 133 to phase detector 171 and the signal supplied through the phase shifter system 163, 167 from band-pass filter 141 will be such as to produce zero output of phase detector 171. Accordingly, the motor 147 remains inactive, and therefore the turntable 145 remains angularly fixed, its angular orientation denoting the bearing of the craft as observed from the fixed station. With gradual variations of craft bearing, as due to craft progress along a non-radial course, a small error voltage appears at the output circuit of phase detector 171, sufficient to cause motor 147 to rotate the table 145 gradually and retain it in the correct angular alignment.

In an instance of appreciable angular disparity between the indicated direction momentarily presented by the direction table 145 and the actual azimuthal bearing of the craft from the fixed station, as at the moment when the apparatus is switched on, then the phase relation between the signal fed directly from band-pass filter 135 to phase detector 169 and the signal supplied by band-pass filter 143 and shifted in phase shifter system 161, 165 will be such as to produce an appreciable voltage at the output terminals of phase detector 169. This voltage is of such polarity as to cause the motor 147 to turn the table 145 in the direction to restore a condition of substantial angular accord of table 145 with the azimuthal bearing of the craft.

Then, until the turntable 145 has been brought to the orientation exactly according to the bearing of the craft, the signal fed directly from band-pass filter 133 and that shifted through units 163 and 167 are in such phase relation that unit 171 provides an output signal compelling motor 147 to continue driving the turntable 145 until the angular setting is the exact representation of craft bearing. In normal operating conditions, after the turntable 145 has once been brought into the proper angular position, the signals from unit 171 continuously retain the turntable 145 in the correct angular orientation.

While the present system can be successfully operated with direct addition of the outputs of the phase detectors 169 and 171 in supplying the motor amplifier 153, it is preferable that the coupling arrangements between the input circuits of the amplifier 153 and the output circuits of units 169 and 171 be so arranged as to suppress or eliminate the contribution from phase detector 171 and to emphasize the contribution from phase detector 169 when the output from unit 169 is appreciable due to a very large angular disparity; and to suppress or shut out the output of phase detector 169 and carry through the output of phase detector 171 when the angular position of turntable 145 is approximately correct, as indicated by the decrease of the output voltage of phase detector 169 to a very low value. In this way, the azimuth position-representing apparatus can be made to be controlled precisely according to the scallop modulation signal, substantially independently of the general pattern frequency component, during such time as approximate angular accord of the turntable prevails as indicated by the output from phase detector 169 remaining in a relatively low range.

For the above purpose, an illustrative coupling arrangement may employ ordinary resistors 177 and 179 connected in series with nonlinear resistors 181 and 183, respectively, in the output circuits of the phase detectors 169 and 171, the control voltage for amplifier 153 being made up as the sum of the voltage drops across resistor 177 and nonlinear resistor 183. Nonlinear resistors 181 and 183 are illustrated as being of the copper oxide rectifier type, each comprising a pair of oppositely connected rectifier elements in order to avoid overall rectification and asymmetrical operation of the phase detector output circuits with respect to the reversible-polarity motor control signals. These nonlinear circuits 177, 181 and 179, 183 act substantially as a relay operating according to the output strength of phase detector 169 to cause the output thereof to be connected to the input circuit of amplifier 153 in place of the output circuit of phase detector 171 when detector 169 provides excessive output voltage.

If preferred, a control circuit may be arranged for selecting the output of one of the phase detectors 169, 171 and excluding the other entirely from exercising any influence on the operation of the servomotor 147. An arrangement for this purpose is illustrated in Fig. 8 where a relay 170 is shown employed in the interconnections of elements 169, 171 and 153 instead of the non-linear circuits shown in Fig. 2.

The actuating coil of the relay 170 is connected across the output circuit of phase detector 169, and the armature is arranged as a double-throw switch for selecting between the two phase detectors. When unit 169 provides a substantial output voltage, the armature is pulled downward, so that the input circuit of unit 153 is supplied solely by this coarse control phase detector 169. When the resulting servo operation has brought the azimuth direction indicator approximately into the proper direction, the output voltage of phase detector 169 is so decreased that the armature is released to move up and substitute the output circuit of phase detector 171 in full control of the amplifier 153 and servomotor 147. The servomotor 147 is thereby operated to the further extent to bring the azimuth direction indicator into perfect accord with the craft direction and through the operation of the phase shifters connected thereto, output of phase detector 171 is reduced to zero. During normal operation, the armature of relay 170 remains in the upper position, and variations of the output of phase detector 171 suffice to retain the turntable 145 in the angular position representing the craft bearing.

The use of the multi-fingered or scalloped fringe in the rotated pattern, and the turntable operation according to the phase comparison between the high amplitude modulation frequency and the corresponding phase reference modulation provide such tight control of the azimuth angle indicator carried by the craft as to minimize the effects of irregular terrain on the indicated bearings. For still further independence of ground reflections of the transmitted energy, and particularly for provision of extremely accurate heading indications in aircraft, the vertical-plane distribution pattern of the transmitted energy may be limited to low angles above the horizon, with very little energy being propagated downward to be reflected up from the earth.

To attempt to extend the rotatable antenna unit into a structure of great height for sharp vertical-plane directivity would be difficult, and would involve serious problems in making such a system dynamically balanced for high speed rotation. According to a further feature of the present invention, the sharp vertical-plane directivity is accomplished without any vertical extension of the rotating unit, by a cylindrical lens system which surrounds the rotating antenna unit 109 and remains stationary. This permits the multi-fingered and limacon-like pattern to be revolved according to the rotation of the vertically pivoted antenna unit, and affects only the vertical-plane energy distribution.

Figure 11:
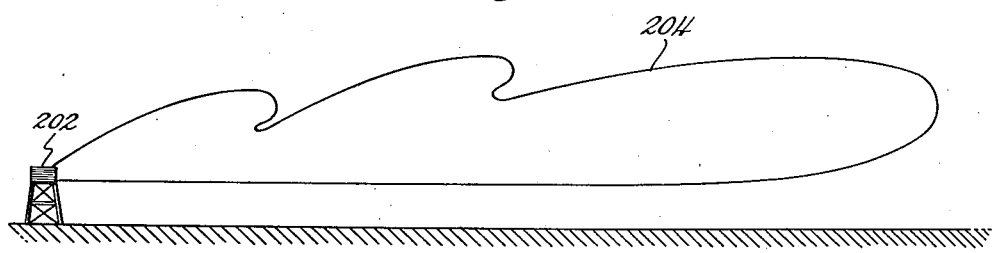
Fig. 11 is a vertical-plane directivity pattern resulting from the use of the antenna system of Fig. 9.
Figure 10:
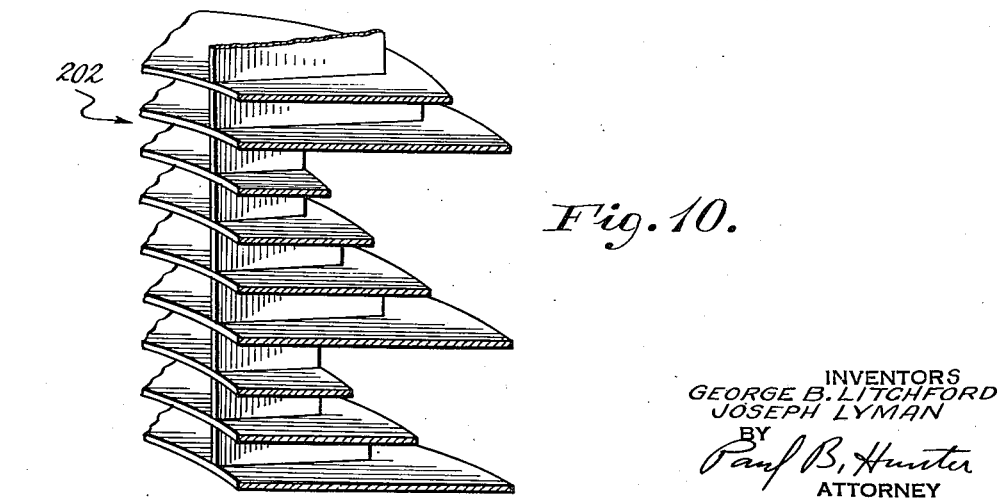
Fig. 10 is an enlarged view of a section of the lens incorporated in the antenna system of Fig. 9.

Such a lens system is illustrated at 202 in Figs. 9 and 10. This lens system surrounding the rotatable antenna 109 provides a vertical-plane directivity pattern as illustrated at 204 in Fig. 11. The complete antenna system is shown in a vertical elevation view in Fig. 9, parts being broken away to provide a clearer view of the honeycombed construction of the cylindrical lens and also to show the position of the rotatable antenna unit in relation thereto, and a portion is shown in magnified view in Fig. 10. The rotated structure may be supplemented, if desired, by a biconical horn 206, 208, for concentrating the energy from the rotatable antenna unit 109 toward the inner cylindrical boundary of the lens 202. Biconical horn 206, 208 preferably is made stationary, with slight clearance for freedom of rotation of unit 109.

The horizontal membranes of the lens 202 are made up as annular metallic discs which may be made with their inner diameters uniform and their outer diameters varied as required according to known ultra-high-frequency lens design techniques.

The antenna system may be supported on a tower and the lens there aids in preventing energy going downward to impinge on roofs of low buildings, e. g. hangars, to be reflected therefrom and tend to introduce minute angular error in the system indications.

Representative dimensions for the antenna system for operation at a frequency of the order of 5000 megacycles are as follows:

| | |
|---|---|
| Outer diameter of coaxial line 403, 405 inches | ⅝ |
| Diameter of drum unit 109 do | 10 |
| Radius of the dipole arms do | ¾ |
| Spacing of the reflector from the axis to the shaft inches | ¾ |
| Height of the reflector do | ½ |
| Length of the reflector do | 1¼ |
| Spacing between the upper and lower discs of the rotating drum inches | 2 |
| Height of the lens system feet | 15 |
| Diameter of the lens system do | 25 |
| Location of the drum: approximately central in the lens system. | |
| Vertical spacing of the horizontal membranes in the lens system inches | 1½ |
| Angular spacing between radial vertical fins in the lens system | Approx. 7° |

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Certain subject matter disclosed herein and particularly relating to the antenna portion is disclosed and claimed in application S. N. 204,580 filed January 5, 1951.

What is claimed is:

1. A radio navigation system comprising antenna means pivoted about a vertical axis for radiating a scalloped or multi-fingered limacon-like azimuthal energy distribution pattern, means for rotating said antenna means about said vertical axis, means coupled to said antenna means for transmitting first and second reference phase signal modulations, said first reference phase signal modulation having a frequency equal to the number of revolutions of said antenna per second and said second reference phase signal modulation having a frequency given by the product of said number of revolutions per second and the number of fingers around said scalloped pattern, craft borne means for receiving energy from said rotating antenna and demodulating said energy to produce first and second amplitude demodulation components at the antenna rotation frequency and the product therewith of a number of fingers in said pattern respectively, craft borne means for detecting said first and second reference phase signal modulations, and means coupled to both said craft borne means for utilizing azimuth bearing data according to the phase comparison between said first amplitude modulation component and said first reference phase signal modulation and according to the phase comparison between said second amplitude modulation component and said second reference phase signal modulation.

2. A radio navigation system as defined in claim 1, wherein said last-named means comprises a rotatable azimuth bearing indicator, a servomotor coupled thereto for turning said indicator, a first phase detector for producing an output voltage varying according to the phase relation between said first amplitude modulation component and said first reference phase signal modulation, a second phase detector for producing an output voltage varying according to the phase relation between said second amplitude modulation component and said second reference phase signal modulation, first and second phase shifter means coupled to said rotatable azimuth bearing indicator for introducing into an input circuit of said first phase detector and an input circuit of said second phase detector, respectively, phase shifts varying according to the angular position of said azimuth bearing indicator, and means for controlling said servomotor primarily according to the output of said first phase detector to bring said azimuth bearing indicator substantially to the angular position corresponding to the direction of the craft from said antenna means and for controlling said servomotor primarily according to the output of said second phase detector to complete the angular positioning of said azimuth bearing indicator according to the direction of the craft from said antenna means.

3. A radio navigation system as defined in claim 1, wherein said antenna means comprises substantially horizontal upper and lower conductive plates vertically spaced apart, an antenna unit substantially centrally located between said plates for launching ultra-frequency electromagnetic waves for propagation radially outward between said plates, and means for introducing phase front distortion in said electromagnetic waves to produce a scalloped phase front thereof in the region between the peripheries of said plates, whereby the azimuthal directive pattern of the emergent energy is characterized by a multi-fingered outline.

4. An omni-azimuth ground station comprising a transmitter for generating radio frequency energy, an antenna assembly coupled to said transmitter and characterized by a radiation pattern of uneven general intensity distribution over a range of azimuthal directions and also by a multi-fingered or scalloped outline, means coupled to said antenna for causing rotation of said radiation pattern at a regular rotation speed, and means for transmitting to craft in the vicinity of said ground station reference phase signals including a first component having a period equal to the period of rotation of said intensity distribution pattern and a second component having a frequency greater than the frequency of said first component by a factor equal to the number of said fingers in the outline of the radiation pattern.

5. A high-precision omni-azimuthal bearing determining system comprising means for transmitting radio energy in an azimuthal intensity distribution pattern characterized by a general limacon-like shape with a plurality of fingers extending outward around the fringe thereof, means coupled to said transmitting means for causing regular rotation of said pattern about the vertical axis, whereby the time variations of intensity thereof in a given direction appear as amplitude modulation of a rotation frequency component and a higher frequency component of frequency equal to the product of rotation frequency and the number of said fingers, and means coupled to said transmitting means for transmitting third and fourth modulation components, said third and fourth modulation components being of frequencies equal respectively to said rotation frequency and said higher frequency, whereby any direction from said transmitting means is defined by the phase relations between the low frequency modulation components supplemented by the phase relation between the higher frequency modulation components.

6. Omni-azimuth apparatus for inclusion in a movable craft, comprising radio receiving means for receiving directional reference radio signals and providing first demodulation signals of frequencies $f$ and $nf$ corresponding to the modulation components resulting from rotation of an $n$-fingered and asymmetrical radiation pattern about a vertical axis, second demodulation means for providing reference phase signals of frequencies $f$ and $nf$ of phases independent of azimuth receiving directions, azimuth bearing indicator means, and phase responsive means coupled to said azimuth bearing indicator means for actuating said indicator means generally according to the phase relation between the demodulation signals of frequency $f$ and for completing the actuation of said azimuth bearing indicator means precisely according to the phase relation between the demodulation signals of frequency $nf$.

7. A navigation radio receiving system comprising a direction indicator, servo means for actuating said indicator, means for receiving and amplitude demodulating scalloped-fringe pattern-modulation signals and separating the low- and high-frequency demodulation components resulting therefrom, means for detecting low- and high-frequency phase reference signal components, and phase comparator means for controlling said servo means according to phase comparisons between said low- and high-frequency demodulation components and said low- and high-frequency phase reference components, respectively.

8. A navigation radio receiving system as defined in claim 7, wherein said phase comparator means comprises a low-frequency phase shifter and a high-frequency phase shifter both coupled to said rotatable direction indicator for producing phase shifts proportional to the angular displacement thereof, and a low-frequency phase detector and a high-frequency phase detector each having two input circuits, said receiving and amplitude demodulating and component separating means being coupled to one input circuit of each of said phase detectors and said means for detecting low- and high-frequency phase reference signal components being coupled to the other input circuit of each of said phase detectors, the coupling to one of the input circuits of said low-frequency phase detectors including said low-frequency phase shifter and the coupling to one input circuit of said high-frequency phase detector including said high-frequency phase shifter, and the output circuits of said phase detectors being coupled to said servo means.

9. A navigation radio receiving system as defined in claim 8 wherein said servo means comprises a reversible servo-motor coupled to said rotatable direction indicator, and the coupling between the output circuits of said phase detectors and said motor includes amplitude-responsive means for selectively differentiating between the relative control contributions of said low-frequency phase detector and said high-frequency phase detector according to the strength of the output of said low-frequency phase detector.

10. An omni-azimuthal radio navigation transmitting system comprising antenna means including a vertical-axis rotatable member for radiating ultra-high-frequency energy in a multi-fingered or multi-lobed azimuth-plane distribution pattern, rotator means coupled to said rotatable member for turning said distribution pattern about said vertical axis at a predetermined angular velocity whereby the field intensity at a point in the vicinity thereof is modulated between maximum and minimum amplitudes during each revolution of said member by a number of modulation cycles corresponding to the number of fingers in said pattern, and means for transmitting phase reference modulation signals having a modulation component of period equal to the period of rotation of said member and another modulation component of period corresponding to the time interval for said member to turn through an angle equal to the angle between two successive fingers in said pattern, said antenna means further including means in said rotatable member for producing an asymmetrical characteristic in said radiation pattern for phase comparison with the modulation component of the rotation period.

11. A radio navigation system comprising antenna means pivoted about a vertical axis for radiating a scalloped or multi-fingered limacon-like azimuthal energy distribution pattern, means for rotating said antenna means about said vertical axis, cylindrical stationary wave guide lens means surrounding said pivoted antenna means coaxially therewith for restricting the vertical-plane energy distribution in the radiation pattern thereof, means coupled to said antenna means for transmitting first and second reference phase signal modulation, said first reference phase signal modulation having a frequency equal to the number of revolutions of said antenna per second and said second reference phase signal modulation having a frequency given by the product of said number of revolutions per second and the number of fingers around said scalloped pattern, craft-borne means for receiving energy from said rotating antenna and demodulating said energy to produce first and second amplitude demodulation components at the antenna rotation frequency and the product therewith of a number of fingers in said pattern, respectively, craft-borne means for detecting said first and second reference phase signal modulations, and means coupled to both said craft-borne means for presenting azimuth bearing data according to the phase comparison between said first amplitude modulation component and said first reference phase signal modulation and according to the phase comparison between said second amplitude modulation component and said second reference phase signal modulation.

12. Omni-azimuth apparatus for inclusion in a movable craft, comprising radio receiving means for receiving directional reference radio signals and providing first demodulation signals of frequencies $f$ and $nf$ corresponding to the modulation components of an asymmetrical $n$-fingered radiation pattern rotated about a vertical axis, second demodulation means for providing reference signals of frequencies $f$ and $nf$, phase responsive means coupled to said demodulation means for providing coarse directional data according to the phase relation between the demodulation signals of frequency $f$ and for providing fine directional data according to the phase relation between demodulation signals of frequency $nf$.

13. Receiving apparatus for use in a coarse and fine omni-azimuth radio bearing indicating system, including means for detecting and separating coarse and fine reference and directional phase signals carried as simultaneous modulations on a single carrier, direction indicator means, first phase detector means responsive to said coarse reference and directional phase signals to actuate said indicator means approximately according to the phase relation between said coarse signals, second phase detector means responsive to said fine reference and directional phase signals and adapted to actuate said indicator means precisely according to the phase relationship between said fine signals, and means responsive to said first phase detector to couple said second phase detector to said indicator means only upon substantial completion of said actuation of said indicator means by said first phase detector means.

GEORGE B. LITCHFORD.
JOSEPH LYMAN.

REFERENCES CITED

The following references are of record in the file of this patent:

UNITED STATES PATENTS

| Number | Name | Date |
| --- | --- | --- |
| 755,840 | Bose | Mar. 29, 1904 |
| 1,990,649 | Ilberg | Feb. 12, 1935 |
| 2,144,203 | Shanklin | Jan. 17, 1939 |
| 2,252,699 | Byrne | Aug. 19, 1941 |
| 2,302,102 | Kandoian | Nov. 17, 1942 |
| 2,377,902 | Relson | June 12, 1945 |
| 2,406,396 | O'Brien | Aug. 27, 1946 |
| 2,420,605 | McConnel | May 13, 1947 |
| 2,422,110 | Luck | June 10, 1947 |
| 2,513,315 | Hawkins | July 4, 1950 |